United States Patent
Ringold

(10) Patent No.: US 8,762,163 B1
(45) Date of Patent: Jun. 24, 2014

(54) SYSTEMS AND METHODS FOR PROCESSING HEALTHCARE CLAIM TRANSACTIONS THAT ARE REJECTED DUE TO A HOST ERROR

(75) Inventor: James Morgan Ringold, Lawrenceville, GA (US)

(73) Assignee: McKesson Financial Holdings Limited, Hamilton (BM)

( * ) Notice: Subject to any disclaimer, the term of this patent is extended or adjusted under 35 U.S.C. 154(b) by 564 days.

(21) Appl. No.: 12/627,701

(22) Filed: Nov. 30, 2009

(51) Int. Cl.
*G06Q 50/00* (2012.01)

(52) U.S. Cl.
USPC .................................... 705/2; 705/3; 705/4

(58) Field of Classification Search
USPC ........................................................ 705/2–4
See application file for complete search history.

(56) References Cited

U.S. PATENT DOCUMENTS

| | | | |
|---|---|---|---|
| 5,628,530 A | 5/1997 | Thornton | |
| 6,012,035 A | 1/2000 | Freeman, Jr. et al. | |
| 6,757,898 B1 | 6/2004 | Ilsen et al. | |
| 6,769,228 B1 | 8/2004 | Mahar | |
| 7,155,397 B2 | 12/2006 | Alexander et al. | |
| 7,917,378 B2 * | 3/2011 | Fitzgerald et al. | 705/4 |
| 2002/0002495 A1 | 1/2002 | Ullman | |
| 2002/0087583 A1 | 7/2002 | Morgan et al. | |
| 2002/0111832 A1 | 8/2002 | Judge | |
| 2002/0198831 A1 | 12/2002 | Patricelli et al. | |
| 2003/0009367 A1 | 1/2003 | Morrison | |
| 2003/0050799 A1 | 3/2003 | Jay et al. | |
| 2003/0149625 A1 | 8/2003 | Leonardi et al. | |
| 2003/0154163 A1 | 8/2003 | Phillips et al. | |
| 2003/0229540 A1 | 12/2003 | Algiene | |
| 2004/0039599 A1 | 2/2004 | Fralic | |
| 2004/0073457 A1 | 4/2004 | Kalies | |

(Continued)

FOREIGN PATENT DOCUMENTS

| | | |
|---|---|---|
| CA | 2482370 | 3/2006 |
| WO | 9503569 | 2/1995 |
| WO | 0039737 | 7/2000 |
| WO | 2007025295 | 3/2007 |

OTHER PUBLICATIONS

National Council for Prescription Drug Programs Front End Edit Manual, as Published by the Centers for Medicare and Medicaid Services in Feb. 2009, hereinafter NCPDP (www.ngscedi.com/outreach_materials/NCPDPErrorCodeManual.pdf).*

(Continued)

*Primary Examiner* — Mark Holcomb
(74) *Attorney, Agent, or Firm* — Sutherland Asbill & Brennan LLP

(57) ABSTRACT

Systems and methods are provided for processing healthcare claim transactions that are rejected due to a host error. The systems and methods may be carried out by a suitable service provider. A healthcare claim transaction received from a healthcare provider computer may be routed to a claims processor computer. A determination may be made that the healthcare claim transaction has not been approved as a result of a host processor error associated with the claims processor computer. Based at least in part on the determination, the healthcare claim transaction may be resubmitted to the claims processor computer.

12 Claims, 4 Drawing Sheets

(56) References Cited

U.S. PATENT DOCUMENTS

| | | |
|---|---|---|
| 2004/0117323 A1 | 6/2004 | Mindala |
| 2004/0148198 A1 | 7/2004 | Kalies |
| 2004/0249745 A1 | 12/2004 | Baaren |
| 2005/0015280 A1 | 1/2005 | Gabel et al. |
| 2005/0060201 A1 | 3/2005 | Connely et al. |
| 2005/0102169 A1 | 5/2005 | Wilson |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240473 A1 | 10/2005 | Ayers |
| 2005/0251429 A1* | 11/2005 | Ammer et al. .................. 705/4 |
| 2005/0288972 A1 | 12/2005 | Marvin et al. |
| 2006/0020514 A1 | 1/2006 | Yered |
| 2006/0026041 A1 | 2/2006 | Ullman et al. |
| 2006/0149784 A1 | 7/2006 | Tholl et al. |
| 2006/0184391 A1 | 8/2006 | Barre et al. |
| 2006/0259363 A1 | 11/2006 | Jhetam |
| 2007/0005402 A1 | 1/2007 | Kennedy et al. |
| 2007/0050209 A1 | 3/2007 | Yered |
| 2007/0136100 A1 | 6/2007 | Daugherty et al. |
| 2007/0233525 A1 | 10/2007 | Boyle |
| 2007/0233526 A1 | 10/2007 | Hoffman et al. |
| 2007/0239493 A1 | 10/2007 | Sweetland et al. |

OTHER PUBLICATIONS

Sampson, R.J., Taking Control of Health Care Costs, Best's Review—Life Health Insurance Edition, Nov. 1983, pp. 64-66, vol. 84, Issue 7, USA.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic: On-line Goes In-House, Chain Store Age Executive, Jan. 1987, pp. 128-132. vol. 63, Issue 1, USA.

Anonymous, TechRx Announces Successful Beta Deployment of T-Rex. PR Newswire. May 13, 2002.

* cited by examiner

SYSTEMS AND METHODS FOR PROCESSING HEALTHCARE CLAIM TRANSACTIONS THAT ARE REJECTED DUE TO A HOST ERROR

FIELD OF THE INVENTION

Aspects of the invention relate generally to healthcare transactions, and more particularly, to processing healthcare claim transactions that are rejected due to a host error.

BACKGROUND OF THE INVENTION

Healthcare claim transactions, such as prescription claim requests, are often routed from a healthcare provider, such as a pharmacy or hospital, to a claims processor through a service provider system. Typically, a healthcare provider communicates a healthcare claim transaction to a service provider, and the service provider routes the healthcare claim transaction to an appropriate claims processor, such as an appropriate insurance provider or other payer. Following adjudication of the healthcare claim transaction by the claims processor, the service provider typically receives an adjudicated reply from the claims processor and routes the received adjudicated reply to the healthcare provider.

During periods of high volume traffic and/or during periods in which the claims processor or payer is experiencing technical difficulties, a healthcare claim transaction may be rejected by the service provider due to a host error associated with the claims processor. In these situations, a suitable rejection code is typically returned to the healthcare provider informing the healthcare provider of the error and instructing the healthcare provider to resubmit the claim at a later point in time. However, in some situations, the healthcare provider will not resubmit the claim, thereby resulting in lost revenue for the healthcare provider. Additionally, in the event that the claim is resubmitted, there is a chance that the claim will be rejected by the claims processor as a duplicate claiming, leading to healthcare provider confusion and administrative difficulties.

Therefore, a need exists for systems and methods for processing healthcare claim transactions that are rejected as a result of a host error.

BRIEF DESCRIPTION OF THE INVENTION

Some or all of the above needs and/or problems may be addressed by certain embodiments of the invention. Embodiments of the invention may include systems, methods, and apparatus for processing healthcare claim transactions that are rejected due to a host error. In one embodiment, a computer-implemented method for processing healthcare claim transaction is provided. A healthcare claim transaction received from a healthcare provider computer may be routed to a claims processor computer. A determination may be made that the healthcare claim transaction has not been approved as a result of a host processor error associated with the claims processor computer. Based at least in part on the determination, the healthcare claim transaction may be resubmitted to the claims processor computer. The operations of the method may be performed by one or more computers associated with a service provider.

In accordance with another embodiment of the invention, a system for processing healthcare claim transaction is provided. The system may include at least one memory and at least one processor. The at least one memory may be operable to store computer-executable instructions. The at least one processor may be configured to route, to a claims processor computer, a healthcare claim transaction received from a healthcare provider computer; determine that the healthcare claim transaction has not been approved as a result of a host processor error associated with the claims processor computer; and resubmit, based at least in part on the determination, the healthcare claim transaction to the claims processor computer.

Additional systems, methods, apparatus, features, and aspects may be realized though the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
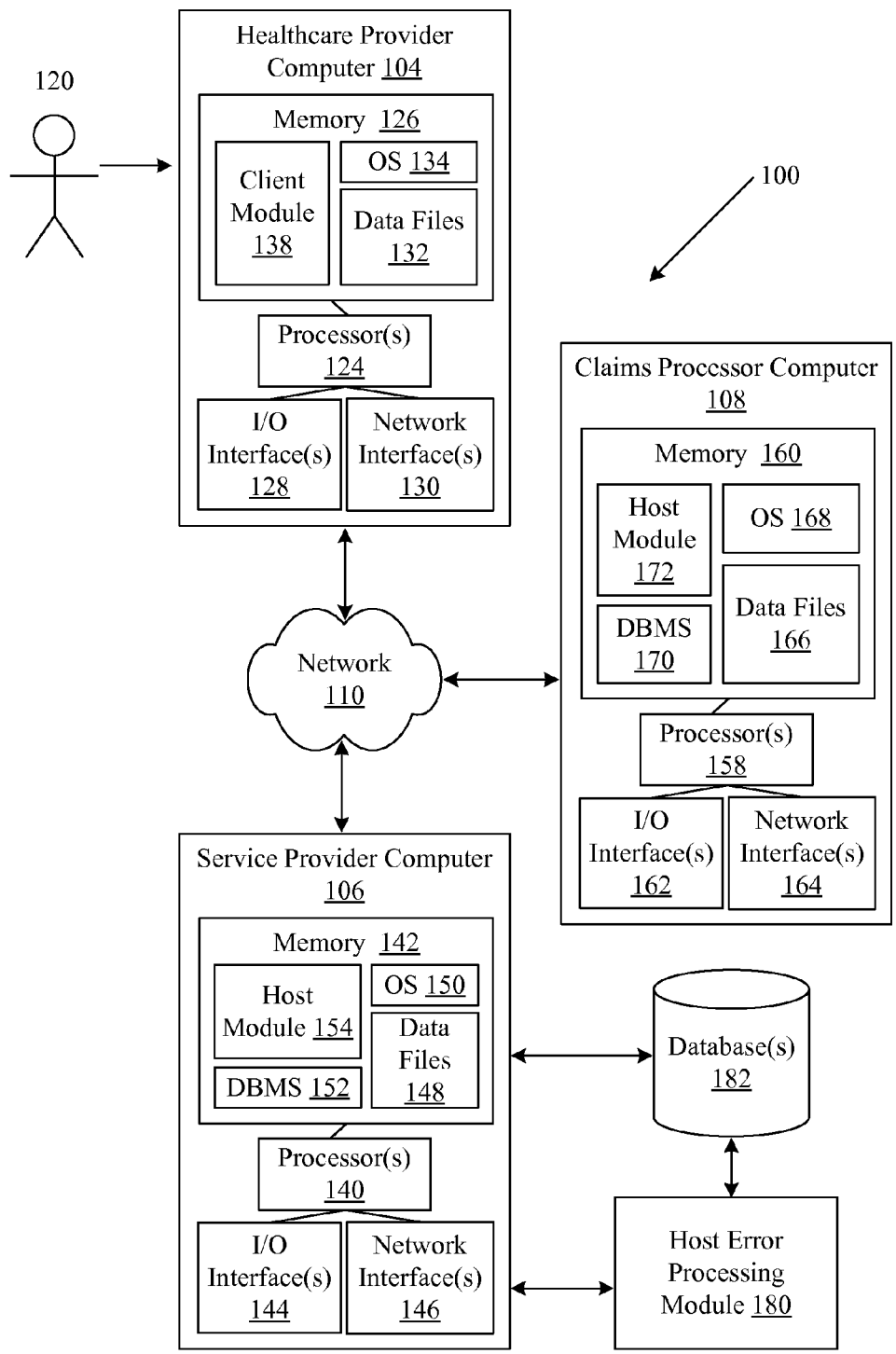
FIG. 1 illustrates an example overview of a system that facilitates the processing of healthcare claim transactions that are rejected due to a host error, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention can provide systems, methods, apparatus, means, and/or mechanisms for processing healthcare claim transactions that are rejected due to a host error. A service provider that is operable to route healthcare claim transactions between healthcare providers, such as a pharmacies, hospitals, and/or physicians' offices, and claims processors, may receive a healthcare claim transaction and route the healthcare claim transaction to a claims processor computer. A determination may be made that the healthcare claim transaction has not been approved as a result of a host processor error triggered by or otherwise associated with the claims processor computer to which the healthcare claim transaction was routed. For example, a determination may be made that the healthcare claim transaction has not been approved due to a timing out situation or due to technical issues associated with the claims processor computer. In certain embodiments, one or more reject codes associated with the healthcare claim transaction may be identified and the one or more reject codes may be utilized to identify a host processor error. As desired, reject codes may be generic reject codes, reject codes for a particular chain of healthcare providers (e.g., a chain of pharmacies), or reject codes for particular healthcare providers. Based at least in part on the determination of a host processor error, the healthcare claim transaction may be resubmitted to the claims processor computer. For example, if the service provider determines that adequate time is available for processing the claim transaction before a deadline for communicating an adjudicated reply to the healthcare provider, then the service provider may resubmit the healthcare claim transaction to the claims processor computer.

In certain embodiments, the service provider may receive an adjudicated reply for the resubmitted healthcare claim transaction from the claims processor computer and determine whether the claim has been approved or rejected. If the claim has been rejected as a duplicate claim, then the service provider may determine that the original claim or a previously submitted claim was approved. The service provider may remove the duplicate status of the claim and communicate an adjudicated reply to the healthcare provider indicating that the healthcare claim transaction has been approved. In this regard, situations in which the healthcare provider must resubmit claims may be reduced. Accordingly, healthcare provider workflow may be enhanced. Additionally, confusion on the part of the healthcare providers as a result of duplicate claim rejections may be reduced or avoided.

System Overview

An example system 100 for processing healthcare transactions that are rejected due to a host error will now be described illustratively with respect to FIG. 1. As shown in FIG. 1, the system 100 may include at least one healthcare provider computer 104, at least one service provider computer 106, and at least one claims processor computer 108. As desired, each of the healthcare provider computer 104, service provider computer 106, and/or claims processor computer 108 may include one or more processing devices that may be configured for accessing and reading associated computer-readable media having stored thereon data and/or computer-executable instructions for implementing the various methods of the invention.

Additionally, in certain embodiments, the service provider computer 106 may include or otherwise be in communication with a host error processing (HEP) module 180 or host error processing application, which may access and/or be in communication with one or more suitable databases 182. The HEP module 180 may identify situations in which a host error has occurred and/or the HEP module 180 receive information associated with healthcare claim transactions that are rejected or not approved due to a host error. The HEP module 180 may then determine whether the healthcare claim transaction may be resubmitted, and the HEP module 180 may selectively resubmit the healthcare claim transaction based upon the determination. In certain embodiments, the HEP module 180 may additionally resolve any issues associated with resubmitted healthcare claim transactions that are rejected by a claims processor as duplicate claims.

Generally, network devices and systems, including one or more of the healthcare provider computer 104, service provider computer 106, and claims processor computer 108 may include or otherwise be associated with suitable hardware and/or software for transmitting and receiving data and/or computer-executable instructions over one or more communications links or networks. These network devices and systems may also include any number of processors for processing data and executing computer-executable instructions, as well as other internal and peripheral components that are well known in the art. Further, these network devices and systems may include or be in communication with any number of suitable memory devices operable to store data and/or computer-executable instructions. By executing computer-executable instructions, each of the network devices may form a special purpose computer or particular machine. As used herein, the term "computer-readable medium" describes any form of suitable memory or memory device.

As shown in FIG. 1, the healthcare provider computer 104, service provider computer 106, and claims processor computer 108 may be in communication with each other via one or more networks, such as network 110, which as described below can include one or more separate or shared private and public networks, including the Internet or a publicly switched telephone network. Each of these components—the healthcare provider computer 104, service provider computer 106, and claims processor computer 108, and the network 110—will now be discussed in further detail.

The healthcare provider computer 104 may be associated with a healthcare provider, for example, a pharmacy, physician's office, hospital, etc. The healthcare provider computer 104 may be any suitable processor-driven device that facilitates the processing of healthcare requests made by patients or consumers and the communication of information associated with healthcare claim transactions to the service provider computer 106, such as a server computer, a mainframe computer, one or more networked computers, a desktop computer, a personal computer, a digital assistant, a personal digital assistant, a digital tablet, an Internet appliance, an application specific circuit, microcontroller, minicomputer, or any other processor-based device. In certain embodiments, the healthcare provider computer 104 may be a suitable point of sale device associated with a healthcare provider. The execution of the computer-implemented instructions by the healthcare provider computer 104 may form a special purpose computer or other particular machine that is operable to facilitate the processing of healthcare requests made by patients and the communication of information associated with healthcare claim transactions to a service provider computer 106. Additionally, in certain embodiments of the invention, the operations and/or control of the healthcare provider computer 104 may be distributed amongst several processing components.

In addition to having one or more processors 124, the healthcare provider computer 104 may include one or more memory devices 126, one or more input/output ("I/O") interface(s) 128, and one or more network interface(s) 130. The memory devices 126 may be any suitable memory devices, for example, caches, read only memory devices, random access memory devices, magnetic storage devices, removable storage devices, etc. The memory devices 126 may store data, executable instructions, and/or various program modules utilized by the healthcare provider computer 104, for example, data files 132, an operating system 134, and/or a client module 138. The data files 132 may include any suitable data that facilitates the receipt and/or processing of healthcare requests by the healthcare provider computer 104 and the generation and/or processing of healthcare claim transactions that are communicated to the service provider computer 106. For example, the data files 132 may include, but are not limited to, healthcare information, patient information, information associated with the service provider computer 106, information associated with one or more claims processors, and/or information associated with one or more healthcare claim transactions. The operating system (OS) 134 may be a suitable software module that controls the general operation of the healthcare provider computer 104. The OS 134 may also facilitate the execution of other software modules by the one or more processors 124, for example, the client module 138. The OS 134 may be, but is not limited to, Microsoft Windows®, Apple OSX™, Linux, Unix, or a mainframe operating system. The client module 138 may be an Internet browser or other software, including a dedicated program, for interacting with the service provider computer 106. For example, a user 120 such as a pharmacist or other pharmacy employee, may utilize the client module 138 in preparing and providing a healthcare claim request, such as a claim request for a prescription refill, to the service processor provider computer 106 for delivery to the appropriate claims processor computer 108 for adjudication or other coverage/benefits determination. The healthcare provider computer 104 may also utilize the client module 138 to retrieve or otherwise receive data, messages, or responses from the service provider computer 106 and/or other components of the system 100.

In operation, the healthcare provider computer 104 may receive information associated with a healthcare request for a patient. As one example, the healthcare provider computer 104 may receive a healthcare request for a patient at a point of sale, such as in a pharmacy during a prescription fulfillment or purchase transaction. As another example, the healthcare provider computer 104 may electronically receive a healthcare request from a patient computer or other patient device. The healthcare provider computer 104 may generate a healthcare claim transaction for the request and information associated with the healthcare claim transaction may be communicated to the service provider computer 106.

The one or more I/O interfaces 128 may facilitate communication between the healthcare provider computer 104 and one or more input/output devices, for example, one or more user interface devices, such as, a display, keypad, control panel, touch screen display, remote control, microphone, etc. that facilitate user interaction with the healthcare provider computer 104. For example, the one or more I/O interfaces 128 may facilitate entry of information associated with a healthcare transaction or healthcare claim request by an employee 120 of a healthcare provider, such as a pharmacy employee. The one or more network interfaces 130 may facilitate connection of the healthcare provider computer 104 to one or more suitable networks, for example, the network 110 illustrated in FIG. 1. In this regard, the healthcare provider computer 104 may receive and/or communicate information to other network components of the system 100, such as the service provider computer 106.

With continued reference to FIG. 1, the service provider computer 106 may include, but is not limited to, any suitable processor-driven device that is configured for receiving, processing, and fulfilling requests from the healthcare provider computer 104 and/or claims processor computer 108 relating to prescription, pharmacy, benefits, and/or healthcare transactions and/or other activities. In certain embodiments, the service provider computer 106 may be a switch/router that routes healthcare claim transactions and/or other healthcare requests. For example, the service provider computer 106 may route billing requests and/or prescription claim requests communicated from the healthcare provider computer 104 to a claims processor computer 108, such as a pharmacy benefits manager (PBM), an insurer, a government payor, or a claims clearinghouse. In certain embodiments, the service provider computer 106 may include a suitable host server, host module, or other software that facilitates the receipt of a healthcare claim transaction from a healthcare provider computer 104 and/or the routing of the received healthcare claim transaction to a claims processor computer 108.

The service provider computer 106 may include any number of special purpose computers or other particular machines, application specific circuits, microcontrollers, personal computers, minicomputers, mainframe computers, servers, networked computers, and/or other processor driven devices. In certain embodiments, the operations of the service provider computer 106 may be controlled by computer-executed or computer-implemented instructions that are executed by one or more processors associated with the service provider computer 106 to form a special purpose computer or other particular machine that is operable to facilitate the receipt, routing, and/or processing of healthcare claim transactions. The one or more processors that control the operations of the service provider computer 106 may be incorporated into the service provider computer 106 and/or in communication with the service provider computer 106 via one or more suitable networks. In certain embodiments of the invention, the operations and/or control of the service provider computer 106 may be distributed amongst several processing components.

Similar to the healthcare provider computer 104, the service provider computer 106 may include one or more processors 140, one or more memory devices 142, one or more input/output ("I/O") interface(s) 144, and one or more network interfaces 146. The one or more memory devices 142 may be any suitable memory devices, for example, caches, read only memory devices, random access memory devices, magnetic storage devices, removable memory devices, etc. The one or more memory devices 142 may store data, executable instructions, and/or various program modules utilized by the service provider 106, for example, data files 148, an operating system ("OS") 150, the host module 154, and a database management system ("DBMS") 152 to facilitate management of data files 148 and other data stored in the memory devices 142 and/or one or more databases 182. The OS 150 may be, but is not limited to, Microsoft Windows®, Apple OSX™, Linux, Unix, or a mainframe operating system.

According to an embodiment of the invention, the data files 148 may store healthcare transaction records associated with communications received from various healthcare provider computers 104 and/or various claims processor computers 108. The data files 148 may also store any number of suitable routing tables that facilitate determining the destination of communications received from a healthcare provider computer 104 or claims processor computer 108. The host module 154 may receive, process, and respond to requests from the client module 138 of the healthcare provider computer 104, and may further receive, process, and respond to requests of the host module 172 of the claims processor computer 108. The service provider computer 106 may include additional program modules for performing other processing methods described herein. Those of ordinary skill in the art will appreciate that the service provider computer 106 may include alternate and/or additional components, hardware or software without departing from example embodiments of the invention.

A host error processing (HEP) module 180 or host error processing application may also be operative with the service provider computer 106. The HEP module 180 may include computer-executable instructions for identifying situations in which a healthcare claim transaction is rejected as a result of a host error and selectively resubmitting the healthcare claim transaction to a claims processor computer. A wide variety of different types of host errors may be identified by the HEP module 180 as desired in various embodiments of the invention, including but not limited to, timing out or unresponsive host (e.g., claims processor) errors, high bandwidth errors, unavailable host errors, technical difficulties associated with the host errors, etc. Host errors may be identified in both situations where no adjudicated reply is received from a claims processor computer and in situations where an adjudicated reply is received. In certain embodiments of the invention, one or more reject codes, such as National Council for Prescription Drug Programs (NCPDP) reject codes, may be associated with identified host errors. A wide variety of different reject codes may be utilized as desired in various embodiments of the inventions, for example, series eighty (80) and/or series ninety (90) reject codes. In certain embodiments, various healthcare providers and/or groups or chain of healthcare providers (e.g., pharmacy chains) may define or be associated with specific host error reject codes or groups of host error reject codes. For example, a pharmacy chain may specify a reject code to be generated by the service provider computer 106 when an unresponsive host or timing out situation is identified. In other embodiments, generic or default reject codes may be utilized, identified, and/or generated by the service provider computer 106 and/or the HEP module 180. Additionally, in certain situations, host error reject codes may be received by the service provider computer 106 from a claims processor computer 108.

According to an aspect of the invention, when a host error is identified by the HEP module 180, the HEP module 180 may retransmit or direct the retransmission of a healthcare claim transaction associated with the identified host error to the appropriate claims processor computer 180. In this regard, the HEP module 180 and the service provider computer 106 may make attempts to have the claim adjudicated without the healthcare provider being required to resubmit the claim. In certain situations, the HEP module 180 may make a determination on whether or not to retransmit the claim transaction based at least in part on one or more timers and/or timing windows associated with the processing of the healthcare claim transaction. For example, the healthcare provider may specify an adjudication time window or timing threshold at which a reply should be received from the service provider computer 106 for a claim that is communicated to the service provider computer 106. When a claim is received by the service provider computer 106, a claim adjudication timer for the claim may be initiated. The value of the claim adjudication timer may then be accessed and utilized in a determination of whether to resubmit a claim.

For example, the value of the claim adjudication timer may be compared to a resubmission threshold and the healthcare claim transaction may be resubmitted if it is determined that the value of the claim adjudication timer is less than the resubmission threshold. The resubmission threshold may define or establish a point in time at which a claim may be resubmitted and adjudicated by the claims processor computer 108 prior to a timing threshold or expiration of a timing window at which a reply should be returned to the healthcare provider computer 104. The value of the resubmission threshold may be defined by the healthcare provider or determined utilizing an adjudication threshold. For example, an average or estimated period of time for a claim to be processed by the claims processor computer 108 may be subtracted from an adjudication threshold to determine a resubmission threshold. The HEP module 180 may resubmit a healthcare claim transaction any number of times as desired in various embodiments. For example, a healthcare claim transaction may be repeatedly or iteratively resubmitted until a resubmission threshold is reached. As desired in various embodiments of the invention, any number of thresholds and/or timers may be utilized. The timers and thresholds described above are provided by way of example only.

Although the present disclosure describes the HEP module 180 retransmitting or directing the retransmission of a healthcare claim transaction to the claims processor computer 108 associated with the identified host error, in other embodiments of the invention, the healthcare claim transaction may be resubmitted to another claims processor computer. For example, if multiple claims processing servers are available for a claims processor, then a healthcare claim transaction may be resubmitted to a second processing server following the identification of a host error associated with a first processing server. For purposes of this disclosure, a resubmission of a healthcare claim transaction to a claims processor computer 108 may refer to a resubmission that is made to any processing server, system, or device associated with the claims processor.

In certain embodiments of the invention, one or more adjudicated replies may be received from a claims processor computers 108. For example, adjudicated replies may be received for original healthcare claim transactions and/or one or more resubmitted healthcare claim transactions. If a received adjudicated reply indicates that the claim has been rejected due to a host error, then a determination may be made as to whether the claim should be resubmitted. In certain embodiments, a received adjudicated reply may indicate that the claim has been rejected as a duplicate claim. In such a situation, the HEP module 180 may determine that a previously submitted claim for which a host error was identified was successful adjudicated and approved by the claims processor computer 108. The HEP module 180 may then alter the claim status of the adjudicated reply to indicate that the claim has been approved, and the HEP module 180 may direct the communication of the altered adjudicated reply to the healthcare provider computer 104. In this regard, administrative difficulties for the healthcare provider in processing duplicate claim rejections may be reduced or eliminated. If a received adjudicated reply indicates that a claim has been approved or rejected for a reason other than a host error or duplicate claim, then the adjudicated reply may be communicated to the healthcare provider computer 104.

The databases 182 may be operable to store information associated with healthcare claim transactions and/or adjudicated replies for claim transactions. In certain embodiments, the databases 182 may store information associated with one or more reject codes associated with host errors. For example, the databases 182 may store information associated with default reject codes, reject codes for specific healthcare providers, and/or reject codes for groups or chains of healthcare providers. As desired, the databases 182 may additionally store one or more preferences for processing healthcare claim transactions that are rejected due to a host error, such as time windows, timing thresholds, and/or processing rules for resubmitting transactions. The one or more preferences may be associated with a wide variety of different entities and/or groups, for example, a specific healthcare provider or chain of healthcare providers. Additionally, default or generic preferences may be stored. The databases 182 may be accessible by the HEP module 180, and the HEP module 180 may utilize the stored information to facilitate the reprocessing of.

With continued reference to the service provider computer 106, the one or more I/O interfaces 144 may facilitate communication between the service provider computer 106 and one or more input/output devices, for example, one or more user interface devices, such as, a display, keypad, control panel, touch screen display, remote control, microphone, etc. that facilitate user interaction with the service provider computer 106. The one or more network interfaces 146 may facilitate connection of the service provider computer 106 to one or more suitable networks, for example, the network 110 illustrated in FIG. 1. In this regard, the service provider computer 106 may communicate with other components of the system 100.

With continued reference to FIG. 1, the claims processor computer 108 may be any suitable processor-driven device that facilitates receiving, processing, and/or fulfilling healthcare claim transactions and/or healthcare claim requests received from the service provider computer 106. For example, the claims processor computer 108 may be a processor-driven device associated with a pharmacy benefits manager (PBM), an insurer, a government payor, or a claims clearinghouse. As desired, the claims processor computer 108 may include any number of special purpose computers or other particular machines, application specific circuits, microcontrollers, personal computers, minicomputers, mainframe computers, servers, and the like. In certain embodiments, the operations of the claims processor computer 108 may be controlled by computer-executed or computer-implemented instructions that are executed by one or more processors associated with the claims processor computer 108 to form a special purpose computer or other particular machine that is operable to facilitate the receipt, processing, and/or fulfillment of healthcare claim transaction requests received from the service provider computer 106. The one or more processors that control the operations of the claims processor computer 108 may be incorporated into the claims processor computer 108 and/or in communication with the claims processor computer 108 via one or more suitable networks. In certain embodiments of the invention, the operations and/or control of the claims processor computer 108 may be distributed amongst several processing components.

Similar to other components of the system 100, the claims processor computer 108 may include one or more processors 158, one or more memory devices 160, one or more input/output ("I/O") interface(s) 162, and one or more network interfaces 164. The one or more memory devices 160 may be any suitable memory devices, for example, caches, read only memory devices, random access memory devices, magnetic storage devices, removable memory devices, etc. The one or more memory devices 160 may store data, executable instructions, and/or various program modules utilized by the claims processor computer 108, for example, data files 166, an operating system ("OS") 168, a database management system ("DBMS") 170, and a host module 172. The data files 166 may include any suitable information that is utilized by the claims processor computer 108 to process healthcare claim transactions, for example, patient profiles, patient insurance information, other information associated with a patient, information associated with a healthcare provider, etc. The operating system (OS) 168 may be a suitable software module that controls the general operation of the claims processor computer 108. The OS 168 may also facilitate the execution of other software modules by the one or more processors 158, for example, the DBMS 170 and/or the host module 172. The OS 168 may be, but is not limited to, Microsoft Windows®, Apple OSX™, Linux, Unix, or a mainframe operating system. The DBMS 170 may be a suitable software module that facilitates access and management of one or more databases that are utilized to store information that is utilized by the claims processor computer 108 in various embodiments of the invention. The host module 172 may initiate, receive, process, and/or respond to requests, such as healthcare claim transactions or claim requests, from the host module 154 of the service provider computer 106. The claims processor computer 108 may include additional program modules for performing other pre-processing or post-processing methods described herein. Those of ordinary skill in the art will appreciate that the claims processor computer 108 may include alternate and/or additional components, hardware or software without departing from example embodiments of the invention.

The one or more I/O interfaces 162 may facilitate communication between the claims processor computer 108 and one or more input/output devices, for example, one or more user interface devices, such as, a display, keypad, control panel, touch screen display, remote control, microphone, etc. that facilitate user interaction with the claims processor computer 108. The one or more network interfaces 164 may facilitate connection of the claims processor computer 108 to one or more suitable networks, for example, the network 110 illustrated in FIG. 1. In this regard, the claims processor computer 108 may receive healthcare claim transactions and/or other communications from the service provider computer 106, and the claims processor computer 108 may communicate information associated with processing claim transactions to the service provider.

The network 110 may include any telecommunication and/or data network, whether public, private, or a combination thereof, including a local area network, a wide area network, an intranet, an internet, the Internet, intermediate hand-held data transfer devices, and/or any combination thereof and may be wired and/or wireless. The network 110 may also allow for real-time, off-line, and/or batch transactions to be transmitted between or among the healthcare provider computer 104, the service provider computer 106, and the claims processor computer 108. Due to network connectivity, various methodologies as described herein may be practiced in the context of distributed computing environments. Although the service provider computer 106 is shown for simplicity as being in communication with the healthcare provider computer 104 or the claims processor computer 108 via one intervening network 110, it is to be understood that any other network configuration is possible. For example, intervening network 110 may include a plurality of networks, each with devices such as gateways and routers for providing connectivity between or among networks 110. Instead of or in addition to a network 110, dedicated communication links may be used to connect the various devices in accordance with an example embodiment of the invention. For example, the service provider computer 106 may form the basis of network 110 that interconnects the healthcare provider computer 104 and the claims processor computer 108.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. For example, in one embodiment, the service provider computer 106 (or other computer) may be implemented as a specialized processing machine that includes hardware and/or software for performing the methods described herein. In addition, at least a portion of the processor and/or processing capabilities of the service provider computer 106 and/or the HEP module 180, may be implemented as part of the claims processor computer 108. Accordingly, embodiments of the invention should not be construed as being limited to any particular operating environment, system architecture, or device configuration.

Operational Overview

Figure 2:
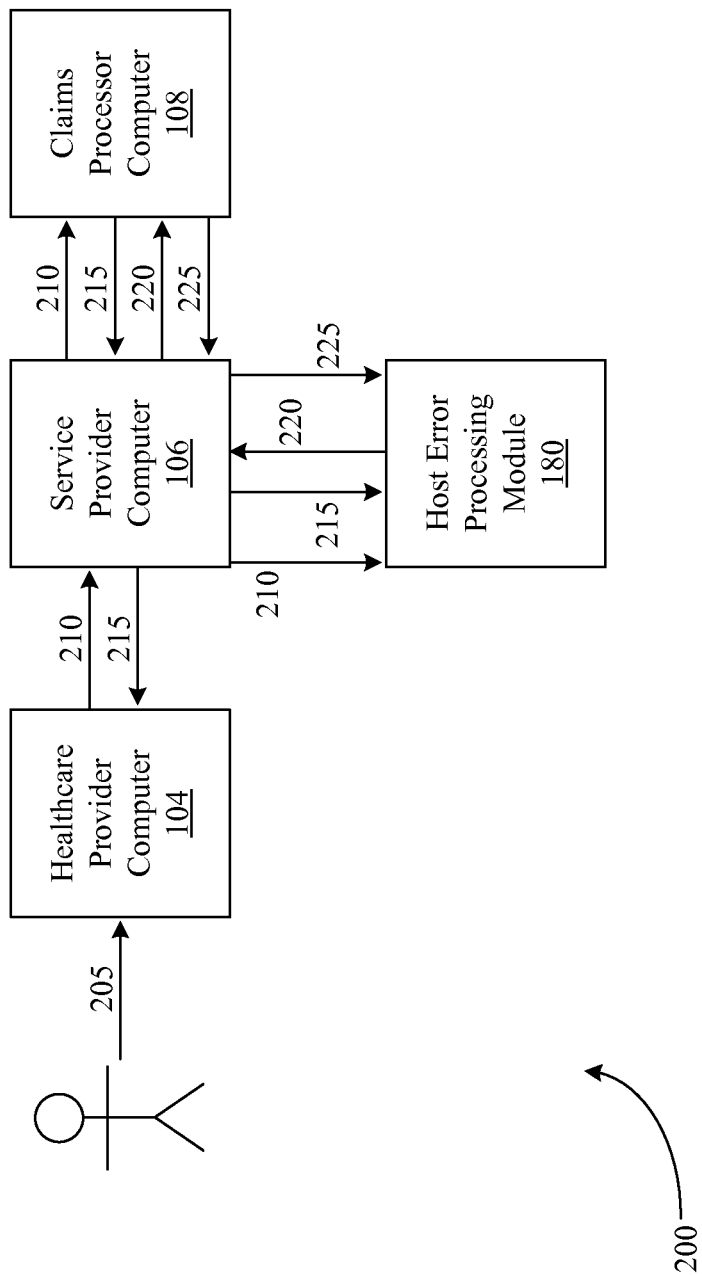
FIG. 2 is a diagram of one example data flow for processing a healthcare claim transaction that has been routed through a service provider and rejected due to a host error associated with a claims processor, according to an illustrative embodiment of the invention.

FIG. 2 is a diagram of one example data flow 200 for processing a healthcare claim transaction that has been routed through a service provided, such as the service provider computer 106 illustrated in FIG. 1, and rejected due to a host error associated with a claims processor, according to an illustrative embodiment of the invention. With reference to FIG. 2, a healthcare provider computer, such as the healthcare provider computer 104 illustrated in FIG. 1, may receive a healthcare request 205 from a patient. The healthcare request 205 may be received in-person or electronically as desired in various embodiments of the invention. For example, a patient may seek to fill a prescription for one or more drugs, medications, and/or other products at a pharmacy location or store. As another example, a patient may communicate a healthcare request 205 to a healthcare provider computer 104 via one or more suitable network connections. For example, a purchase request may be communicated to a healthcare provider computer 104 from a customer computer or customer device via a web portal hosted by the healthcare provider computer 104.

The healthcare provider computer 104 may receive and process the request 205 to generate a healthcare claim transaction 210, such as a healthcare claim request or a prescription claim request, and the healthcare claim transaction 210 may be communicated by the healthcare provider computer 104 to the service provider computer 106. According to an example embodiment of the invention, the healthcare claim transaction 210 may be in accordance with a version of a National Council for Prescription Drug Programs (NCPDP) Telecommunication Standard, although other standards may be utilized as well. As desired, the healthcare claim transaction 210 may include a Banking Identification Number (BIN) and/or a Processor Control Number (PCN) for identifying a particular claims processor computer, such as the claims processor computer 108 illustrated in FIG. 1, as a destination for the healthcare claim transaction 210. In addition, the healthcare claim transaction 210 may also include information relating to the patient, payor, prescriber, healthcare provider, and/or the prescribed drug or product. As an example, the healthcare claim transaction 210 received by the service provider computer 106 may include one or more of the following information:

Payor ID/Routing Information
    BIN Number (i.e. Banking Identification Number) and/or Processor Control Number (PCN) that designates a destination of the healthcare claim transaction 210
Patient Information
    Name (e.g., Patient Last Name, Patient First Name, etc.)
    Date of Birth of Patient
    Age of Patient
    Gender
    Patient Address (e.g., Street Address, Zip Code, etc.)
    Patient ID or other identifier
Insurance/Coverage Information
    Cardholder Name (e.g., Cardholder First Name, Cardholder Last Name)
    Cardholder ID and/or other identifier (e.g., person code)
    Group ID and/or Group Information
Prescriber Information
    Primary Care Provider ID or other identifier (e.g., NPI code)
    Primary Care Provider Name (e.g., Last Name, First Name)
    Prescriber ID or other identifier (e.g., NPI code, DEA number)
    Prescriber Name (e.g., Last Name, First Name)
    Prescriber Contact Information (e.g., Telephone Number)
    Pharmacy or other Healthcare Provider Information (e.g., store name, chain identifier, etc.)
    Pharmacy or other Healthcare Provider ID (e.g., National Provider Identifier (NPI) code)
Claim Information
    Drug or product information (e.g., National Drug Code (NDC))
    Prescription/Service Reference Number
    Date Prescription Written
    Quantity Dispensed
    Number of Days Supply
    Diagnosis/Condition
    Pricing information for the drug or product (e.g., network price, Usual & Customary price)
    One or more NCPDP Message Fields
Date of Service.

The service provider computer 106 may receive the healthcare claim transaction 210 from the healthcare provider computer 104, and the service provider computer 106 may process the healthcare claim transaction 210. As desired, the service provider computer 106 may perform one or more pre-edits on the healthcare claim transaction 210. The pre-edits may add and/or edit information included in the healthcare claim transaction 210 prior to the healthcare claim transaction 210 being communicated to an appropriate claims processor computer 108. In certain embodiments, a pre-edit may be performed that initiates or starts an adjudication timer for the healthcare claim transaction 210. The timer may be initiated by the service provider computer 106 or by a HEP module associated with the service provider computer 106, such as the HEP module 180 illustrated in FIG. 1. For example, a pre-edit may be initiated for identifying host errors and the pre-edit may activate or initiate the adjudication timer. The healthcare claim transaction 210 and/or a copy of the healthcare claim transaction 210 may then be routed or otherwise communicated by the service provider computer 106 to the appropriate claims processor computer 108 for adjudication. According to an example embodiment, the service provider computer 106 may utilize at least a portion of the information included in the healthcare claim transaction 210, such as a BIN/PCN, to determine the appropriate claims processor computer 108 to route the healthcare claim transaction 210 to. The service provider computer 106 may also include a routing table, perhaps stored in memory, for determining which claims processor computer 108 to route the healthcare claim transaction 210 to.

The claims processor computer 108 may receive and adjudicate or otherwise process the healthcare claim transaction 210. For example, the claims processor computer 108 may determine benefits coverage for the healthcare claim transaction 210 according to an adjudication process associated with eligibility, pricing, and/or utilization review. The claims processor computer 108 may transmit an adjudicated reply 215 for the healthcare claim transaction 210 to the service provider computer 106. The service provider computer 106 may receive the adjudicated reply 215 from the claims processor computer 108. As desired, the service provider computer 106 may perform any number of post-edits on the adjudicated reply. For example, if the healthcare provider computer 104 or underlying healthcare provider has activated a host error edit, then the adjudicated reply 215 or a copy of the adjudicated reply 215 may be communicated to the HEP module 180 for further processing. The HEP module 180 may determine whether or not the received adjudicated reply 215 indicates that the claim has been rejected due to a host error associated with the claims processor computer 108. For example, in certain embodiments, the HEP module 180 may identify one or more reject codes in the adjudicated reply 215 that are associated with a host error. In other embodiments, an adjudicated reply 215 may not be received for the healthcare claim transaction 210, and the HEP module 180 may identify a host error based upon the failure to receive an adjudicated reply 215. For example, a timing out or unresponsiveness error may be identified.

In certain embodiments, the identification of a host error may involve the identification and/or generation of one or more reject codes for the healthcare claim transaction 210. As desired, these reject codes may be suitable NCPDP reject codes, such as eighty (80) and/or ninety (90) series reject codes. Additionally, in certain embodiments, specific host error reject codes may be identified and/or generated for a particular healthcare provider or group of healthcare providers. In this regard, a healthcare provider may define host errors. Additionally, if the healthcare claim transaction 210 is ultimately rejected due to a host error, then a reject code may be provided to the healthcare provider computer 104 in a format that is desired by the healthcare provider. In other embodiments, default host error reject codes may be utilized.

If the HEP module 180 identifies a host error, then the HEP module 180 may determine whether or not the healthcare claim transaction 210 should be resubmitted to the claims processor computer 108. In certain embodiments, the resubmission determination may be based at least in part on an evaluation of the adjudication timer. For example, the HEP module 180 may determine whether the value of the adjudication timer satisfies one or more threshold values, such as a claim resubmission threshold. If the HEP module 180 determines that the healthcare claim transaction 210 should be resubmitted, then the HEP module 180 may direct the routing of a duplicate claim transaction 220 or copy of the original claim transaction to the claims processor computer 108 by the service provider computer 106. The duplicate claim transaction 220 may be processed by the HEP module 180 in a similar manner as the original healthcare claim transaction 210. For example, in certain embodiments, the duplicate claim transaction 220 may be processed by the claims processor computer 108 and an adjudicated reply 225 for the duplicate claim transaction 220 may be communicated to the service provider computer 106 by the claims processor computer 108. As desired, the adjudicated reply 225, a copy of the adjudicated reply 225, and/or information from the adjudicated reply 225 may be communicated to the HEP module 180 for processing. In certain embodiments, a host error may be identified based upon information included in the received adjudicated reply 225 for the duplicate claim transaction 220 or based upon the failure to receive an adjudicated reply for the duplicate claim transaction 220. If a host error is identified, then the HEP module 180 may determine whether or not to resubmit the healthcare claim transaction to the claims processor computer 108 in a similar manner as that described for the original claim 210. The healthcare claim transaction 210 may be resubmitted any number of times as desired in various embodiments of the invention.

Upon a successful adjudication of the claim by the claims processor computer 108 or upon the expiration or near expiration of a timing window associated with the claim, an adjudicated reply 215 for the healthcare claim transaction 210 may be communicated by the service provider computer 106 to the healthcare provider computer 104. If the HEP module 180 determines that the original healthcare claim transaction 210 or a resubmitted duplicate claim transaction 220 was accepted by the claims processor computer 108 or rejected for a reason other than a host error or duplicate claim error, then an appropriate adjudicated reply 215 indicating the approval or rejection may be communicated to the healthcare provider computer 104. If, however, the HEP module 180 determines that the claim is rejected due to a host error and cannot be resubmitted within the timing window, then the adjudicated reply 215 may indicate that the healthcare claim transaction 210 was rejected due to a host error. The healthcare provider computer 104 may then process and/or resubmit the claim.

In certain circumstances, an adjudicated reply 225 received by the service provider computer 106 from a claims processor computer 108 may indicate that a resubmitted duplicate claim transaction 220 has been rejected as a duplicate claim. Based upon the duplicate claim rejection, the HEP module 180 may determine that a previously submitted claim (e.g., the original healthcare claim transaction 210 or a previously resubmitted duplicate claim transaction 220) was successfully processed and approved by the claims processor computer 108. For example, even though a host error was identified for a previously submitted claim, the claims processor computer 108 may have successfully processed the claim. The HEP module 180 may alter or change the status of the claim from a status indicating that the claim has been rejected as a duplicate claim to a status indicating that the claim has been approved. The adjudicated reply 215 that is communicated to the healthcare provider computer 104 may then indicate that the healthcare claim transaction 210 has been approved. In this regard, administrative difficulties for the healthcare provider with respect to duplicate claim rejections may be reduced and/or eliminated.

Figure 3:
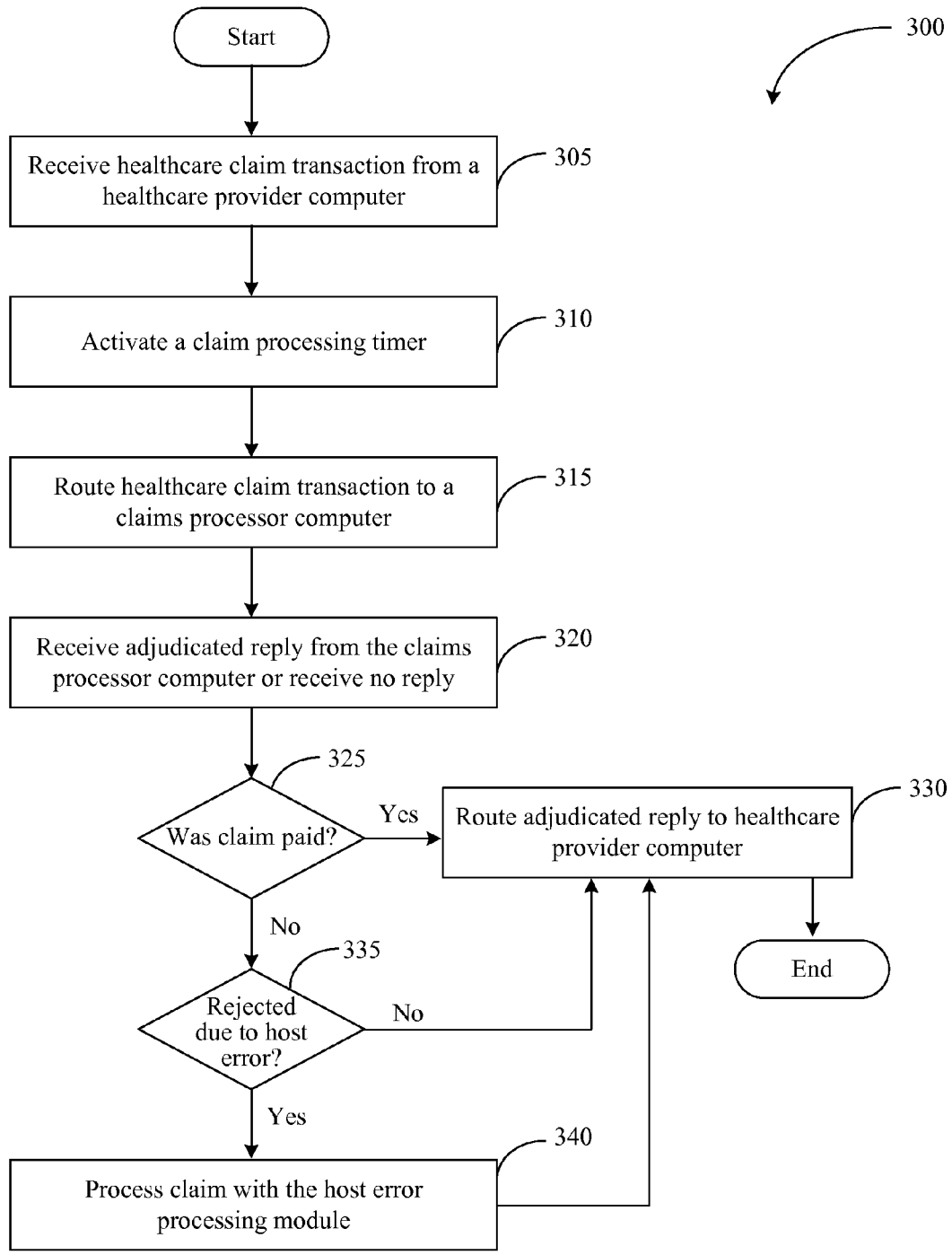
FIG. 3 is a flow chart of an example method for processing a healthcare claim transaction, according to an illustrative embodiment of the invention.

As described herein, healthcare transactions and/or adjudicated replies may be examined as they are routed to or through a service provider computer 106. In this regard, host error may be identified and processed by the service provider computer 106 and/or the HEP module 180 in real time or near real time as the healthcare transactions are routed to or through the service provider computer 106. FIG. 3 is a flow chart of an example method 300 for processing a healthcare claim transaction, according to an illustrative embodiment of the invention The method 300 may be performed by a suitable service provider computer and/or an associated host error processing module, such as the service provider computer 106 and HEP module 180 illustrated in FIG. 1. The method 300 may begin at block 305.

At block 305, a healthcare claim transaction may be received from a healthcare provider computer, such as the healthcare provider computer 104 illustrated in FIG. 1. Any number of pre-edits may be performed on the received healthcare claim transaction as desired in various embodiments of the invention. For example, a host error processing edit may be initiated for the healthcare claim transaction, and the healthcare claim transaction may be processed by the HEP module 180. A claim processing timer or adjudication timer may be activated for the healthcare claim transaction at block 310. Then, at block 315, the healthcare claim transaction may be routed to an appropriate claims processor computer, such as the claims processor computer 108 illustrated in FIG. 1.

At block 320, an adjudicated reply for the healthcare claim transaction may be received from the claims processor computer 108. Alternatively, a determination may be made that not adjudicated reply has been received. For example, a timing out situation or unresponsive claims processor situation may be identified. If an adjudicated reply is received, then any number of post-edits may be performed on the received adjudicated reply as desired in various embodiments of the invention. For example, the HEP module 180 may process the adjudicated reply or a copy of the adjudicated reply.

At block 325, a determination may be made as to whether the claim has been paid or approved by the claims processor computer 108. For example, a received adjudicated reply may be analyzed in order to determine whether the claim has been paid or approved. If it is determined at block 325 that the claim has been paid, then operations may continue at block 330, and the adjudicated reply indicating that the claim has been paid may be routed to the healthcare provider computer 104. If, however, it is determined at block 325 that the claim has not been paid, then operations may continue at block 335. For example, if an adjudicated reply indicates that the claim has been rejected or if no adjudicated reply is received, then operations may continue at block 335.

At block 335, a determination may be made as to whether the claim has been rejected as a result of a host error. A wide variety of host errors may be identified as desired in various embodiments of the invention, as discussed in greater detail above. Additionally, as desired, identified host errors may be associated with a wide variety of different reject codes as discussed above. Host errors may be identified from a received adjudicated reply or based at least in part on a determination that no adjudicated reply has been received. If it is determined at block 335 that the claim has not been rejected due to a host error, then operations may continue at block 330, and an adjudicated reply indicating that the claim has been rejected may be routed or otherwise communicated to the healthcare provider computer 104. If, however, it is determined at block 335 that the claim has been rejected due to a host error, then operations may continue at block 340. In other words, if a host error is identified, then operations may continue at block 340.

At block 340, the HEP module 180 may process the claim that has been rejected due to an identified host error. For example, the HEP module 180 may resubmit the claim to the claims processor computer 108 in an attempt to have the claim processed. An example of the processing that may be performed by the HEP module 180 for a claim that has been rejected due to a host error is described in greater detail below with reference to FIG. 4. Once the rejected claim has been processed by the HEP module 180 at block 340, then operations may continue at block 330 and an adjudicated reply for the claim may be communicated to the healthcare provider computer 104.

The method 300 may end following block 330.

Figure 4:
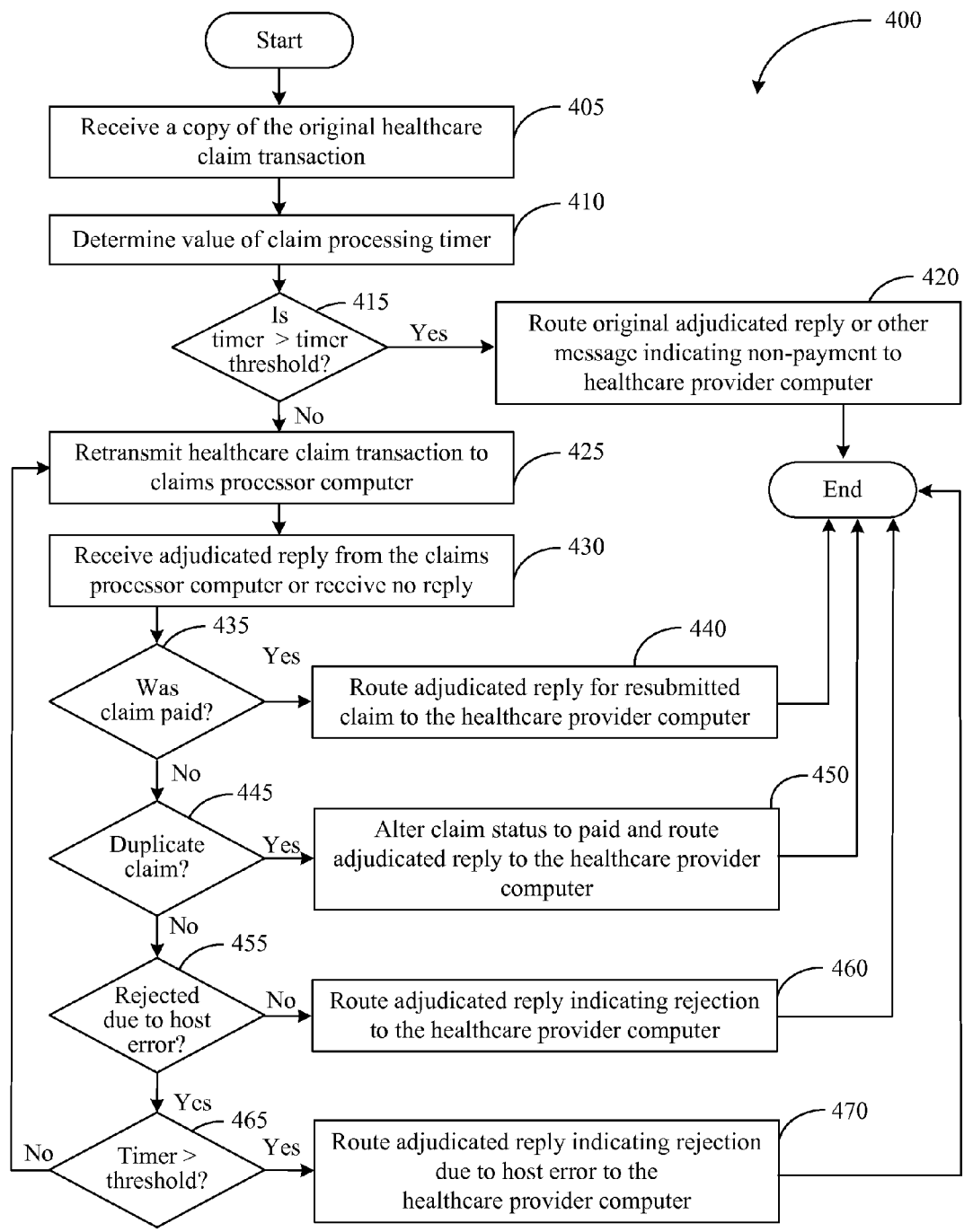
FIG. 4 is a flow chart of an example method for processing a healthcare claim transaction that has been rejected due to a host error, according to an illustrative embodiment of the invention.

FIG. 4 is a flow chart of an example method 400 for processing a healthcare claim transaction that has been rejected due to a host error, according to an illustrative embodiment of the invention. The method 400 illustrated in FIG. 4 may be an example implementation of block 340 shown in FIG. 3. As such, the method 400 may be performed by a suitable service provider computer and/or host error processing module, such as the service provider computer 106 and/or HEP module 180 illustrated in FIG. 1. The method 400 may begin at block 405.

At block 405, a copy of an original healthcare claim transaction may be received, accessed, or otherwise obtained following the identification of a host error. Alternatively, information extracted from the original healthcare claim transaction may be obtained. The value of a claim processing timer or adjudication timer for processing the healthcare claim transaction may be determined or accessed at block 410. The timer value may represent an approximate time that has elapsed since the original healthcare claim transaction was received by the service provider computer 106 from a healthcare provider computer, such as the healthcare provider computer 104 illustrated in FIG. 1.

At block 415, a determination may be made as to whether the timer value is greater than a timer threshold, such as a threshold for resubmitting the claim transaction. A threshold for resubmitting the claim transaction may define, for example, an estimated latest point in time at which the claim transaction can be resubmitted and likely adjudicated prior to the expiration of a timing window for processing the claim transaction and returning an adjudicated reply to the healthcare provider computer 104. If it is determined at block 415 that the timer value is greater than the timer threshold, then operations may continue at block 420. At block 420, an adjudicated reply or other message may be communicated to the healthcare provider computer 104 indicating that the claim has been rejected or not paid due to a host error. The adjudicated reply may be an adjudicated reply received from a claims processor computer, such as the claims processor computer 108 illustrated in FIG. 1, that indicates a host error. Alternatively, the adjudicated reply may be generated by the HEP module 180, for example, in situations where no adjudicated reply has been received from the claims processor computer 108.

If, however, it is determined at block 415 that the timer value is not greater than the timer threshold, then operations may continue at block 425. At block 425, the original healthcare claim transaction or a copy of the original healthcare claim transaction may be resubmitted to the claims processor computer 108. Once the healthcare claim transaction has been resubmitted, the claim transaction may be processed in a similar manner as the original healthcare claim transaction. For example, an adjudicated reply may be received for the resubmitted healthcare claim transaction from the claims processor computer 108 at block 430. Alternatively a determination may be made at block 430 that not adjudicated reply has been received. For example, a timing out situation or unresponsive claims processor situation may be identified.

At block 435, a determination may be made as to whether the resubmitted claim has been paid or approved by the claims processor computer 108. For example, a received adjudicated reply may be analyzed in order to determine whether the claim has been paid or approved. If it is determined at block 435 that the claim has been paid, then operations may continue at block 440, and the adjudicated reply indicating that the claim has been paid may be routed or otherwise communicated to the healthcare provider computer 104. If, however, it is determined at block 435 that the claim has not been paid, then operations may continue at block 445. For example, if an adjudicated reply indicates that the claim has been rejected or if no adjudicated reply is received, then operations may continue at block 445.

At block 445, a determination may be made as to whether the resubmitted claim has been rejected by the claims processor computer 108 as a duplicate claim. For example, a received adjudicated reply may be analyzed in order to identify a reject code or other indicator for a duplicate claim rejection. If it is determined at block 445 that the resubmitted claim has been rejected as a duplicate claim, then operations may continue at block 450. At block 450, the claim status of the adjudicated reply indicating that the claim has been rejected as a duplicate claim may be altered to a claim status indicating that the claim has been approved or paid by the claims processor computer 108. The altered adjudicated reply may then be routed or otherwise communicated to the healthcare provider computer 104. In this regard, administrative difficulties on the part of the healthcare provider with respect to duplicate claims may be reduced or eliminated by the HEP module 180.

If, however, it is determined at block 445 that the claim has not been rejected by the claims processor computer 108 as a duplicate claim, then operations may continue at block 455. A block 455, a determination may be made as to whether the claim has been rejected as a result of a host error. A wide variety of host errors may be identified as desired in various embodiments of the invention, as discussed in greater detail above. Additionally, as desired, identified host errors may be associated with a wide variety of different reject codes as discussed above. Host errors may be identified from a received adjudicated reply or based at least in part on a determination that no adjudicated reply has been received. If it is determined at block 455 that the claim has not been rejected due to a host error, then operations may continue at block 460, and an adjudicated reply indicating that the claim has been rejected may be routed or otherwise communicated to the healthcare provider computer 104. If, however, it is determined at block 455 that the claim has been rejected due to a host error, then operations may continue at block 465. In other words, if a host error is identified, then operations may continue at block 465.

At block 465, the current value of the claim processing timer or adjudication timer for the claim may be accessed or determined, and a determination may be made as to whether the timer value is greater than the timer threshold. If it is determined at block 465 that the timer value is not greater than the timer threshold, then operations may continue at block 425 and the healthcare claim transaction may be resubmitted to the claims processor computer 108. If, however, it is determined at block 465 that the timer value is greater than the timer threshold, then operations may continue at block 470.

At block 470, an adjudicated reply or other message may be communicated to the healthcare provider computer 104 indicating that the claim has been rejected or not paid due to a host error. The adjudicated reply may be an adjudicated reply received from the claims processor computer 108 that indicates a host error. Alternatively, the adjudicated reply may be generated by the HEP module 180, for example, in situations where no adjudicated reply has been received from the claims processor computer 108.

The method 400 may end following either block 420, 440, 450, 460, or 470.

The operations described and shown in the methods 300, 400 of FIGS. 3-4 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-4 may be performed.

Accordingly, example embodiments of the invention can provide the technical effects of creating a system, method, and apparatus that identifies host errors with respect to healthcare claim transactions and resubmits healthcare claims in an attempt to have them processed by a claims processor. Additionally, example embodiments of the invention can provide the technical effects of resolving duplicate claim rejections. In this regard, healthcare provider work flow may be increased and administrative difficulties for the healthcare provider may be reduced.

Various block and/or flow diagrams of systems, methods, apparatuses, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method, comprising:
routing, to a claims processor computer, a healthcare claim transaction received from a healthcare provider computer;
receiving an adjudicated reply, from the claims processor computer, to the healthcare claim transaction;
responsive to a determination that the adjudicated reply indicates that the claim transaction was paid, route the adjudicated reply indicating that the claim was paid to the healthcare provider computer;
responsive to a determination that the adjudicated reply indicates that the claim transaction was not paid, further determining whether the healthcare claim transaction has not been approved as a result of a host processor error associated with the claims processor computer;
responsive to a determination that the claim has not been rejected as a result of a host processing error, route the adjudicated reply indicating that the claim was not paid to the healthcare provider computer;

responsive to a determination that the claim has not been approved as a result of a host processing error, perform the following steps:
  identifying, based at least in part on the received adjudicated reply, a host processing error associated with the claims processor computer, wherein the host processing error includes at least one of an unresponsive host error, a high bandwidth error, or an unavailable host error;
  further identifying a National Council for Prescription Drug Programs (NCPDP) reject code associated with the host processing error;
  determining that the healthcare claim transaction has not been approved as a result of the identified host processor error associated with the claims processor computer;
  determining that a value of an adjudication timer initiated by a pre-edit performed on the healthcare claim transaction prior to routing to the claims processor and associated with identifying the host processing error does not exceed a resubmission threshold, wherein the resubmission threshold is determined by subtracting an estimated healthcare claim processing time from an adjudication threshold; and
  resubmitting, based at least in part on the determination that the healthcare claim transaction has not been approved and that the value of the adjudication timer does not exceed the resubmission threshold, the healthcare claim transaction to the claims processor computer;
  receiving an adjudicated reply for the resubmitted healthcare claim transaction from the claims processor computer, and routing the received adjudicated reply to the healthcare provider computer,
wherein the above operations are performed by one or more computers associated with a service provider.

2. The computer-implemented method of claim 1, wherein determining that the healthcare claim transaction has not been approved as the result of the host processing error further comprises identifying a timing out situation associated with the healthcare claim transaction.

3. The computer-implemented method of claim 1, further comprising:
  determining, based at least in part on the received adjudicated reply, that the resubmitted healthcare claim transaction has been rejected as a duplicate claim; and
  altering a claim status of the adjudicated reply to a status indicating that the healthcare claim transaction has been approved.

4. The computer-implemented method of claim 1, further comprising:
  determining, based at least in part on the received adjudicated reply, that the resubmitted healthcare claim transaction has not been approved as a result of the host processor error associated with the claims processor computer; and
  directing a second resubmission of the healthcare claim transaction to the claims processor computer.

5. The computer-implemented method of claim 4, wherein directing the second resubmission of the healthcare claim transaction comprises:
  accessing a value of a claims processing timer associated with the second resubmission of the healthcare claim transaction; and
  determining, that the accessed value of the claims processing timer does not exceed a timer threshold.

6. The computer-implemented method of claim 1, further comprising:
  identifying a timing out situation associated with the resubmitted healthcare claim transaction;
  generating a message indicating that the healthcare claim transaction has been rejected due to host processor error; and
  communicating the generated message to the healthcare provider computer.

7. A system, comprising:
at least one memory operable to store computer-executable instructions; and
at least one processor configured to access the at least one memory and execute the computer-executable instructions to:
  route, to a claims processor computer, a healthcare claim transaction received from a healthcare provider computer;
  receive an adjudicated reply from the claims processor computer to the healthcare claim transaction;
  responsive to a determination that the adjudicated reply indicates that the claim transaction was paid, route the adjudicated reply indicating that the claim was paid to the healthcare provider computer;
  responsive to a determination that the adjudicated reply indicates that the claim transaction was not paid, further determining whether the healthcare claim transaction has not been approved as a result of a host processor error associated with the claims processor computer;
  responsive to a determination that the claim has not been rejected as a result of a host processing error, route the adjudicated reply indicating that the claim was not paid to the healthcare provider computer;
  responsive to a determination that the claim has not been approved as a result of a host processing error, perform the following steps:
    identify, based at least in part on the received adjudicated reply, a host processing error associated with the claims processor computer, wherein the host processing error includes at least one of an unresponsive host error, a high bandwidth error, or an unavailable host error;
    further identifying a National Council for Prescription Drug Programs (NCPDP) reject code associated with the host processing error;
    determine that the healthcare claim transaction has not been approved as a result of the identified host processor error associated with the claims processor computer;
    determine that a value of an adjudication timer initiated by a pre-edit performed on the healthcare claim transaction prior to routing to the claims processor and associated with identifying the host processing error does not exceed a resubmission threshold, wherein the resubmission threshold is determined by subtracting an estimated healthcare claim processing time from an adjudication threshold;
    resubmit, based at least in part on the determination that the healthcare claim transaction has not been approved and that the value of the adjudication timer does not exceed the resubmission threshold, the healthcare claim transaction to the claims processor computer; and
    receive an adjudicated reply for the resubmitted healthcare claim transaction from the claims processor computer, and routing the received adjudicated reply to the healthcare provider computer.

8. The system of claim 7, wherein the at least one processor is operable to determine that the healthcare claim transaction has not been approved as the result of the host processing error by identifying a timing out situation associated with the healthcare claim transaction.

9. The system of claim 7, wherein the at least one processor is further operable to execute the computer-executable instructions to:
   determine, based at least in part on the received adjudicated reply, that the resubmitted healthcare claim transaction has been rejected as a duplicate claim; and
   alter a claim status of the adjudicated reply to a status indicating that the healthcare claim transaction has been approved.

10. The system of claim 7, wherein the at least one processor is further operable to execute the computer-executable instructions to:
    determine, based at least in part on the received adjudicated reply, that the resubmitted healthcare claim transaction has not been approved as a result of the host processor error associated with the claims processor computer; and
    direct a second resubmission of the healthcare claim transaction to the claims processor computer.

11. The system of claim 10, wherein the at least one processor is operable to direct the second resubmission of the healthcare claim transaction by:
    accessing a value of a claims processing timer associated with the second resubmission of the healthcare claim transaction; and
    determining, that the accessed value of the claims processing timer does not exceed a timer threshold.

12. The system of claim 7, wherein the at least one processor is further configured to execute the computer-implemented instructions to:
    identify a timing out situation associated with the resubmitted healthcare claim transaction;
    generate a message indicating that the healthcare claim transaction has been rejected due to host processor error; and
    communicate the generated message to the healthcare provider computer.

* * * * *